(12) United States Patent
Rissa et al.

(10) Patent No.: US 9,965,064 B2
(45) Date of Patent: May 8, 2018

(54) FLEXIBLE AUTO-STEREOSCOPIC DISPLAY CONTROL AND ADJUSTMENT OF THE PARALLEL BARRIER ARRANGEMENT BASED ON BENDING OF THE DISPLAY

(71) Applicant: Nokia Corporation, Espoo (FI)

(72) Inventors: Tero Rissa, Siivikkala (FI); Aki Happonen, Kiiminki (FI)

(73) Assignee: Nokia Technologies Oy, Espoo (FI)

( * ) Notice: Subject to any disclaimer, the term of this patent is extended or adjusted under 35 U.S.C. 154(b) by 435 days.

(21) Appl. No.: 14/351,737

(22) PCT Filed: Oct. 5, 2012

(86) PCT No.: PCT/IB2012/055379
§ 371 (c)(1),
(2) Date: Apr. 14, 2014

(87) PCT Pub. No.: WO2013/054243
PCT Pub. Date: Apr. 18, 2013

(65) Prior Publication Data
US 2014/0232647 A1    Aug. 21, 2014

Related U.S. Application Data

(63) Continuation of application No. 13/274,047, filed on Oct. 14, 2011, now abandoned.

(51) Int. Cl.
*G06F 3/041* (2006.01)
*G06F 1/16* (2006.01)
(Continued)

(52) U.S. Cl.
CPC ......... *G06F 3/041* (2013.01); *G02B 27/2214* (2013.01); *G06F 1/1652* (2013.01);
(Continued)

(58) Field of Classification Search
CPC .......................... G06F 3/041; G02B 27/2214
(Continued)

(56) References Cited

U.S. PATENT DOCUMENTS 5,315,377 A * 5/1994 Isono ..................... G03B 35/24
345/419
7,573,491 B2    8/2009 Hartkop et al.
(Continued)

FOREIGN PATENT DOCUMENTS

CN          1784022 A      6/2006
CN        101349817 A      1/2009
(Continued)

OTHER PUBLICATIONS

Lin, Shiuan-lou et al. "3.2: The Application of Flexible Liquid-Crystal Display in High Resolution Switchable Autostereoscopic 3D Display". SID Symposium Digest of Technical Papers 44.1 (2013): 5-6. Web.*

(Continued)

*Primary Examiner* — Barry Drennan
*Assistant Examiner* — Shivang Patel
(74) *Attorney, Agent, or Firm* — Alston & Bird LLP (57) ABSTRACT

An apparatus, a method and a non-transitory computer readable medium is provided. The apparatus includes: at least one processor; and at least one memory storing computer program instructions configured, working with the at least one processor, to cause the apparatus to perform at least the following: detecting bending of a flexible auto-stereoscopic display comprising a parallax barrier arrangement; and compensating for movement of the parallax barrier arrangement, caused by the bending of the flexible auto-stereoscopic display, by adjusting one or more characteristics of the flexible auto-stereoscopic display in dependence upon the bending of the flexible auto-stereoscopic display.

20 Claims, 6 Drawing Sheets

(51) Int. Cl.
 *G02B 27/22* (2018.01)
 *H04N 13/04* (2006.01)
 *G06F 3/01* (2006.01)

(52) U.S. Cl.
 CPC ............ *G06F 1/1684* (2013.01); *G06F 3/013* (2013.01); *H04N 13/0409* (2013.01); *H04N 13/0484* (2013.01); *G06F 2203/04102* (2013.01)

(58) Field of Classification Search
 USPC .......................................................... 345/418
 See application file for complete search history.

(56) References Cited

U.S. PATENT DOCUMENTS

| | | | | |
|---|---|---|---|---|
| 2006/0126177 | A1* | 6/2006 | Kim | H04N 13/0409 359/465 |
| 2009/0168164 | A1 | 7/2009 | Kean et al. | |
| 2009/0244682 | A1 | 10/2009 | Saishu et al. | |
| 2010/0056223 | A1 | 3/2010 | Choi et al. | |
| 2010/0060983 | A1 | 3/2010 | Wu et al. | |
| 2010/0238367 | A1* | 9/2010 | Montgomery | G02B 6/005 349/15 |
| 2011/0090413 | A1* | 4/2011 | Liou | G02B 27/2214 349/15 |

FOREIGN PATENT DOCUMENTS

| | | |
|---|---|---|
| CN | 101772672 A | 7/2010 |
| DE | 10 2007 060 461 A1 | 6/2009 |
| EP | 0 899 650 A2 | 3/1999 |
| EP | 2 202 624 A2 | 6/2010 |
| EP | 2 357 548 | 8/2011 |
| GB | 2 405 043 A | 2/2005 |
| WO | WO 2007/048855 A1 | 5/2007 |
| WO | WO 2009/044613 A1 | 4/2009 |
| WO | WO 2010/041227 A1 | 4/2010 |

OTHER PUBLICATIONS

S. Y. Yi, H. B. Chae and S. H. Lee, "Moving Parallax Barrier Design for Eye-Tracking Autostereoscopic Displays," 2008 3DTV Conference: The True Vision—Capture, Transmission and Display of 3D Video, Istanbul, 2008, pp. 165-168.*
Office Action for Chinese Application No. 201280050213.4 dated Dec. 2, 2015.
Office Action for U.S. Appl. No. 13/274,047 dated Apr. 11, 2013.
International Search Report and Written Opinion for Application No. PCT/IB2012/055379 dated Jun. 3, 2013.
Hyun Lee. "Moving Parallax Barrier Design for Eye-Tracking Autostereoscopic Displays, Sang-Yi Yi, 2Ho-Byung Chae and 2Seung," Jan. 1, 2008 (Jan. 1, 2008), XP055116100.
Extended European Search Report for European Patent Application No. 12840709.5 dated Mar. 20, 2015, 8 pages.

* cited by examiner

FLEXIBLE AUTO-STEREOSCOPIC DISPLAY CONTROL AND ADJUSTMENT OF THE PARALLEL BARRIER ARRANGEMENT BASED ON BENDING OF THE DISPLAY

TECHNOLOGICAL FIELD

Embodiments of the present invention relate to auto-stereoscopic display control. In particular, they relate to controlling a parallax barrier arrangement of a flexible auto-stereoscopic display.

BACKGROUND

A stereoscopic display is configured to convey a stereoscopic image (that is, a three dimensional image) to a viewer. Some stereoscopic displays require a viewer to wear special glasses (such as polarized glasses or active shutter glasses) in order to obtain the stereoscopic effect.

An auto-stereoscopic display is configured to convey a stereoscopic image to a viewer without requiring the viewer to wear special glasses to view the displayed stereoscopic image.

Some forms of auto-stereoscopic display include a parallax barrier arrangement. The parallax barrier arrangement controls which parts of the display can be seen by each eye of the viewer from a particular position. Each eye sees a different image, which results in a stereoscopic effect for the viewer.

BRIEF SUMMARY

According to various, but not necessarily all, embodiments of the invention there is provided an apparatus, comprising: at least one processor; and at least one memory storing computer program instructions configured, working with the at least one processor, to cause the apparatus to perform at least the following: detecting bending of a flexible auto-stereoscopic display comprising a parallax barrier arrangement; and compensating for movement of the parallax barrier arrangement, caused by the bending of the flexible auto-stereoscopic display, by adjusting one or more characteristics of the flexible auto-stereoscopic display in dependence upon the bending of the flexible auto-stereoscopic display.

According to various, but not necessarily all, embodiments of the invention there is provided a method, comprising: detecting bending of a flexible auto-stereoscopic display comprising a parallax barrier arrangement; and compensating for movement of the parallax barrier arrangement, caused by the bending of the flexible auto-stereoscopic display, by adjusting one or more characteristics of the flexible auto-stereoscopic display in dependence upon the bending of the flexible auto-stereoscopic display.

According to various, but not necessarily all, embodiments of the invention there is provided an apparatus comprising means for performing the above method.

According to various, but not necessarily all, embodiments of the invention there is provided a non-transitory computer readable medium storing computer program instructions that, when performed by at least one processor, cause at least the following to be performed: detecting bending of a flexible auto-stereoscopic display comprising a parallax barrier arrangement; and compensating for movement of the parallax barrier arrangement, caused by the bending of the flexible auto-stereoscopic display, by adjusting one or more characteristics of the flexible auto-stereoscopic display in dependence upon the bending of the flexible auto-stereoscopic display.

According to various, but not necessarily all, embodiments of the invention there is provided an apparatus comprising: means for detecting bending of a flexible auto-stereoscopic display comprising a parallax barrier arrangement; and means for compensating for movement of the parallax barrier arrangement, caused by the bending of the flexible auto-stereoscopic display, by adjusting one or more characteristics of the flexible auto-stereoscopic display in dependence upon the bending of the flexible auto-stereoscopic display.

BRIEF DESCRIPTION

For a better understanding of various examples of embodiments of the present invention reference will now be made by way of example only to the accompanying drawings in which.

DETAILED DESCRIPTION

Embodiments of the invention relate to controlling a parallax barrier arrangement of a flexible auto-stereoscopic display. An image displayed on the flexible display may be viewable in three dimensions from one or more viewer positions ("sweet spots"). At all other viewer positions, the viewer may see a two-dimensional image displayed on the flexible display rather than a three-dimensional image.

In embodiments of the invention, if a user bends the flexible auto-stereoscopic display, the three-dimensional effect is advantageously maintained at one or more of the "sweet spots" by adjusting one or more characteristics of the flexible display. For example, one or more of the following may be adjusted: the parallax barrier arrangement, the brightness of one or more pixels of the flexible display and the hue of one or more pixels of the flexible display.

In this regard, the figures illustrate an apparatus 10/30, comprising: at least one processor 12; and at least one memory 14 storing computer program instructions 16 configured, working with the at least one processor 12, to cause the apparatus 10/30 to perform at least the following: detecting bending of a flexible auto-stereoscopic display 20 comprising a parallax barrier arrangement 22; and compensating for movement of the parallax barrier arrangement 22, caused by the bending of the flexible auto-stereoscopic display 20, by adjusting one or more characteristics of the flexible auto-stereoscopic display 20 in dependence upon the bending of the flexible auto-stereoscopic display 20.

Figure 1:
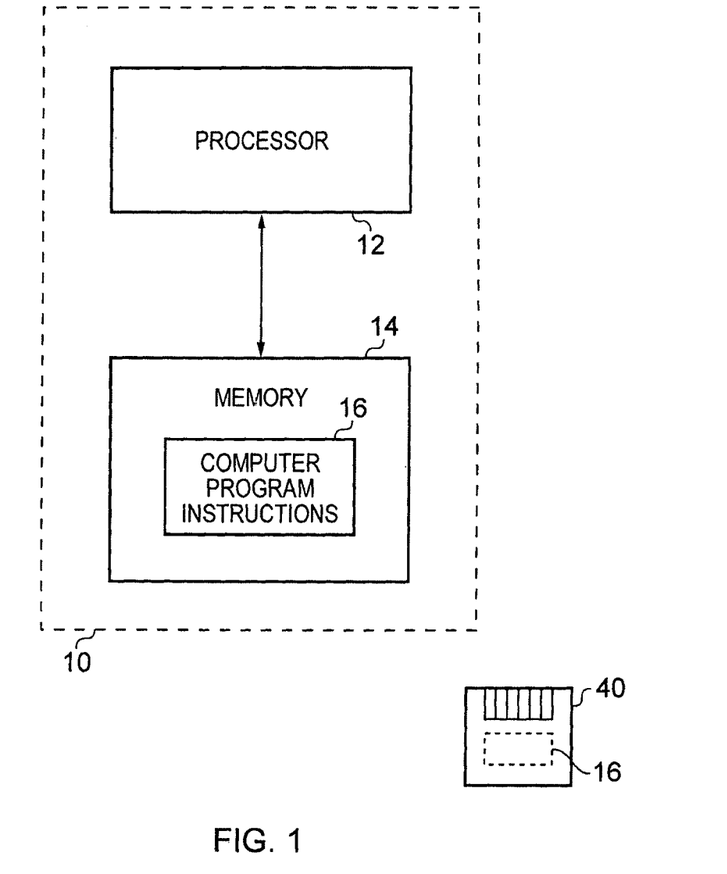
FIG. 1 illustrates an apparatus.

FIG. 1 illustrates a schematic of an apparatus 10 comprising at least one processor 12 and at least one memory 14. The apparatus 10 may, for example, be a chip or a chipset. Although a single processor 12 and a single memory 14 are illustrated in FIG. 1, in some implementations of the invention more than one processor 12 and/or more than one memory 14 is provided.

The processor 12 is configured to read from and write to the memory 14. The processor 12 may also comprise an output interface via which data and/or commands are output by the processor 12 and an input interface via which data and/or commands are input to the processor 12.

Although the memory 14 is illustrated as a single component it may be implemented as one or more separate components some or all of which may be integrated/removable and/or may provide permanent/semi-permanent/dynamic/cached storage.

The memory 14 stores computer program instructions 16 that control the operation of the apparatus 10 when loaded into the processor 12. The computer program instructions 16 provide the logic and routines that enables the apparatus 10/30 to perform the method illustrated in FIG. 3. The processor 12 by reading the memory 14 is able to load and execute the computer program instructions 16.

The computer program instructions 16 may arrive at the apparatus 10/30 via any suitable delivery mechanism 40. The delivery mechanism 40 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program instructions 16. The delivery mechanism 40 may be a signal configured to reliably transfer the computer program instructions 16. The apparatus 10/30 may propagate or transmit the computer program instructions 16 as a computer data signal.

Figure 2:
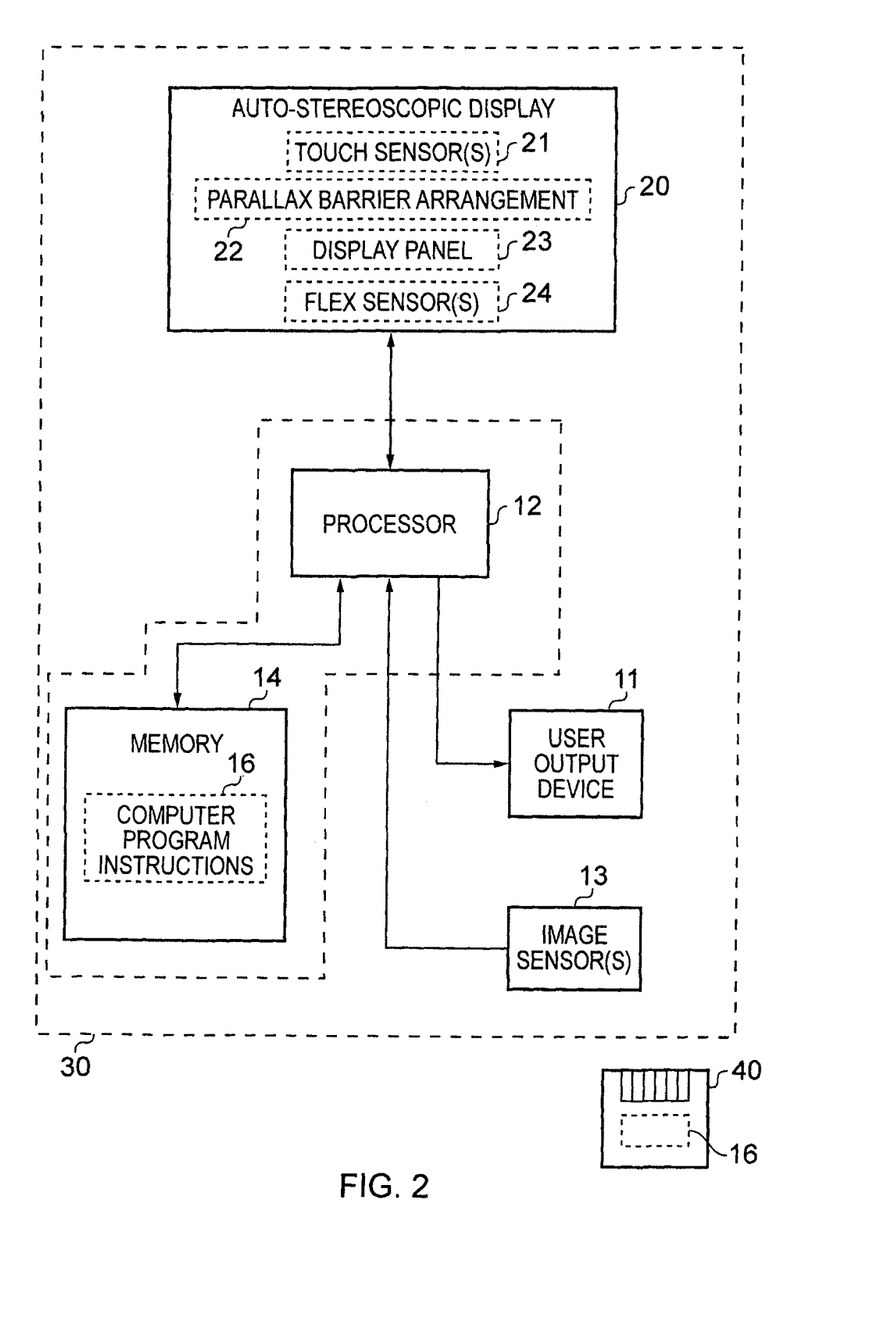
FIG. 2 illustrates a further apparatus.

FIG. 2 illustrates a schematic of a further apparatus 30. The apparatus 30 may, for example, be a hand-portable electronic apparatus. The apparatus 30 may be configured to operate as a mobile telephone, an electronic book, a tablet computer, a games console and/or a portable music player.

The apparatus 30 illustrated in FIG. 2 comprises a flexible auto-stereoscopic display 20, a user output device 11, one or more image sensors 13 and the apparatus 10 illustrated in FIG. 1. The elements 11, 12, 13, 14 and 20 are operationally coupled and any number or combination of intervening elements can exist (including no intervening elements). The elements 11, 12, 13, 14 and 20 may be co-located within a housing.

The user output device 11 may, for example, be an illumination apparatus comprising one or more light emitting diodes. The processor 12 is configured to provide control outputs to the user output device 11.

The processor 12 is also configured to read image data from the one or more image sensors 13. The one or more image sensors 13 may, for example, be charge coupled devices (CCDs) or complementary metal-oxide-semiconductor (CMOS) sensors.

The flexible auto-stereoscopic display 20 comprises one or more touch sensors 21, a parallax barrier arrangement 22, a (flexible) display panel 23 and one or more flex sensors 24.

The one or more touch sensors 21 are configured to sense touch input from a user (for example, fingertip or stylus input). The processor 12 is configured to read the touch sensor(s) 21. The touch sensor(s) 21 may be any type of touch sensors, including resistive sensors, capacitive sensors, infrared sensors or surface acoustic wave sensors, or some combination of these sensors.

The display panel 23 comprises a plurality of pixels arranged in columns and rows. The processor 12 is configured to control the display panel 23 to display stereoscopic images (that is, three dimensional images) and non-stereoscopic images (that is, two dimensional images).

The display panel 23 may be any type of flexible display panel. It could, for example, be a liquid crystal display panel (LCD), an organic light emitting diode (OLED) display panel, a quantum dot display panel or an electrophoretic ink (E Ink) display panel.

The one or more flex sensors 24 are configured to sense when the flexible display 20 is bent (for example by a user). The one or more flex sensors 24 may also sense the position(s) at which the flexible display 20 has been bent and the extent to which it has been bent. The processor 12 is configured to read the flex sensor(s) 24. The one or more flex sensors 24 may, for example, comprise one or more strain gauges, one or more piezoelectric sensors, one or more optical sensors, one or more capacitive sensors and/or one or more resistive sensors.

The parallax barrier arrangement 22 is positioned between the display panel 23 and a viewer of the display panel 23. It is controlled by the processor 12. When the display 20 is in a stereoscopic (three-dimensional) mode, the processor 12 controls the parallax barrier arrangement 22 to provide a plurality of opaque regions that define a plurality of slits. In this mode, the parallax barrier arrangement 22 separates light emanating from the display panel 23 such that the viewer's left eye sees a different image to the viewer's right eye. Image content for viewer's left eye and image content for the viewer's right eye is displayed concurrently on the display panel 23.

When the display 20 is in a non-stereoscopic (two dimensional) mode, the processor 12 controls the parallax barrier arrangement 22 such that it does not separate out light emanating from the display panel 23 for the viewer's left and right eyes. For example, in this mode, the parallax barrier arrangement 22 may be transparent.

The parallax barrier arrangement 22 may comprise at least one parallax barrier. Each parallax barrier may, for example, comprise a switching liquid crystal that includes portions which switch from being substantially opaque to being substantially transparent.

An example of a method according to embodiments of the invention will now be described with reference to FIG. 3.

Initially, the flexible auto-stereoscopic display 20 is in stereoscopic mode. A viewer is positioned in a position (a "sweet spot") that enables him to view the display 20 stereoscopically. At this time, the flexible display 20 is substantially planar in shape.

The viewer of the display 20 subsequently bends/flexes the display 20 using his hands, such that a cross-section of the flexible display 20 defines a curve. At block 300 of FIG. 3, the processor 12 detects bending of the flexible display 20 by reading the one or more flex sensors 24. The output provided by the flex sensors 24 to the processor 12 may, for example, indicate the position(s) at which the flexible display 20 has been bent and/or the magnitude/extent of the bending.

Figure 4:
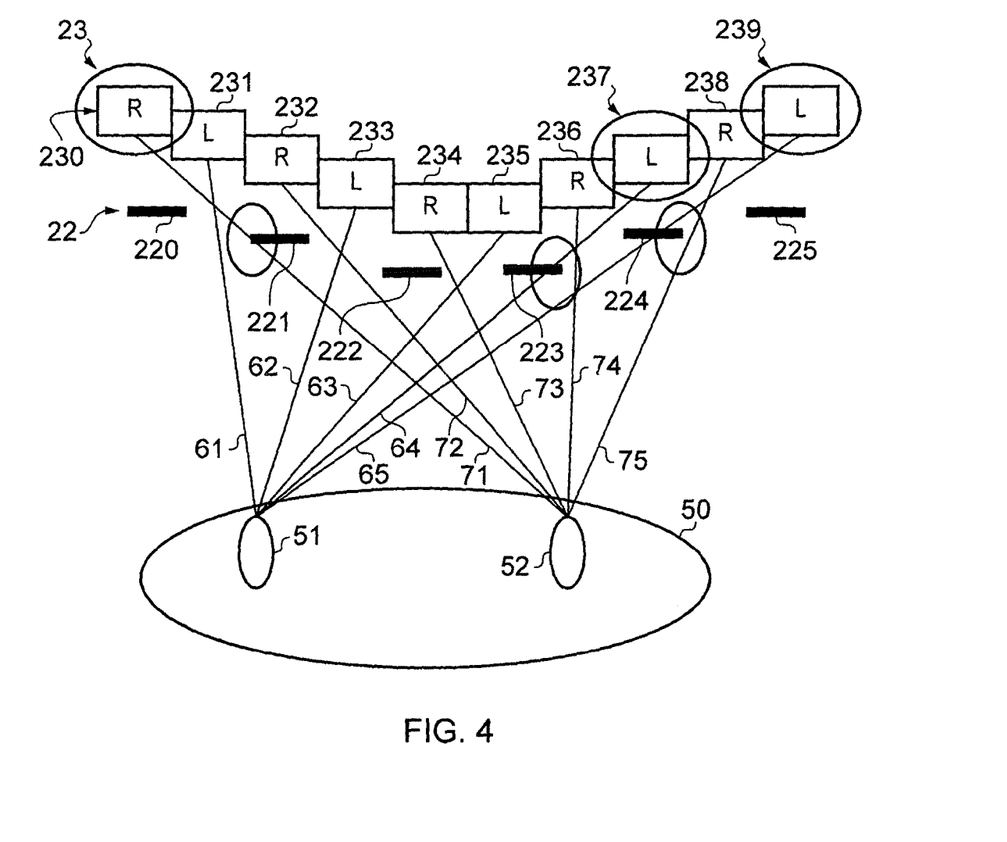
FIG. 4 schematically illustrates a viewer viewing a flexible auto-stereoscopic display comprising a parallax barrier arrangement and a display panel, where the flexible auto-stereoscopic display has been bent, and neither the parallax barrier arrangement nor the pixels of the display panel have been adjusted to compensate for the bending.

FIG. 4 is a schematic illustrating a viewer 50 viewing the flexible auto-stereoscopic display 20 following bending of the display 20, and without adjustment of the parallax barrier arrangement 22 and without any adjustment of the information content displayed by the display panel 23 following the bending.

A cross section of the display panel 23 comprising ten pixels 230-239 is shown for illustrative purposes. Each pixel 230-239 is positioned in a different column in the display panel 23. The pixels 230, 232, 234, 236 and 238 are displaying image content for viewer's right eye 52 and the pixels 231, 233, 235, 237 and 239 are displaying image content for the viewer's left eye 51. The illustrated parallax barrier arrangement 22 comprises a plurality of opaque regions 220-225 which define a plurality of slits.

Prior to the flexible display 20 being bent by the viewer 50, the viewer's left eye 51 was able to see pixels 231, 233, 235, 237 and 239 and the viewer's right eye 52 was able to see pixels 230, 232, 234, 236 and 238. The parallax barrier arrangement 22 prevented the viewer's left eye 51 from seeing pixels 230, 232, 234, 236 and 238 and prevented the viewer's right eye 52 from seeing pixels 231, 233, 235, 237 and 239, in order to provide a stereoscopic effect.

After the flexible display 20 was bent by the viewer 50 (as shown in FIG. 4), the viewer's left eye 51 is still able to see pixels 231, 233 and 235, because light passing through those pixels reaches the viewer's left eye 51 (see light rays 61, 62 and 63 in FIG. 4). However, the viewer 50 cannot see pixels 237 and 239, because the light passing through those pixels is being blocked by the opaque regions 223 and 224 (see light rays 64 and 65 in FIG. 4). The viewer's right eye 52 is able to see pixels 232, 234, 236 and 238 (see light rays 72-75 in FIG. 4) but it cannot see pixel 230, because light passing through that pixel is being blocked by the opaque region 221 (see light ray 71 in FIG. 4).

In some circumstances, it may also be the case that, due to the inappropriate positioning of the parallax barrier arrangement 22 following bending of the flexible display 20, the viewer's right eye 52 can see image content that is being displayed for his left eye 51 and the viewer's left eye 51 can see image content that is being displayed for his right eye 52. Alternatively or additionally, the viewer's right eye 52 may only be able to see part of individual pixels displaying image content for his right eye 52 (due to the other part of each of those pixels being obscured by the parallax barrier arrangement 22), and the viewer's left eye 51 may only be able to see part of individual pixels displaying image content for his left eye 51 (due to the other part of each of those pixels being obscured by the parallax barrier arrangement 22).

The viewer 50 in FIG. 4 will either see a poorer quality stereoscopic image following bending of the flexible display 20, or he will lose the stereoscopic effect altogether. However, in embodiments of the invention, this may be avoided. This is because, at block 301 of FIG. 3, the processor 12 compensates for movement of the parallax barrier arrangement 22, caused by the bending of the flexible auto-stereoscopic display 20, by adjusting one or more characteristics of the flexible auto-stereoscopic display 20 in dependence upon the bending of the flexible auto-stereoscopic display 20.

The one or more characteristics of the flexible auto-stereoscopic display 20 that may be adjusted include: the parallax barrier arrangement 22, the brightness of one or more pixels of the flexible display 20 and the hue of one or more pixels of the flexible display 20.

The adjustment of the one or more characteristics of the flexible auto-stereoscopic display 20 compensates for the change in visibility of one or more of the pixels that occurs as a result of the bending of the flexible display 20. The adjustment may, for example, depend upon the position of the parallax barrier arrangement 22 following the bending of the flexible display 20 and the positions of the viewer's eyes 51, 52. The adjustment is intended to mitigate the perceived change/degradation in the visual appearance of auto-stereoscopic image content being displayed by the flexible display 20 that would otherwise occur when the flexible display 20 is bent.

Changes that are made to the brightness and/or the hue of the pixels following bending of the flexible display 20 alter the actual information content that is displayed by the display panel 23, but mitigate the perceived change in the visual appearance of the displayed information content from the perspective of the viewer.

Figure 5:
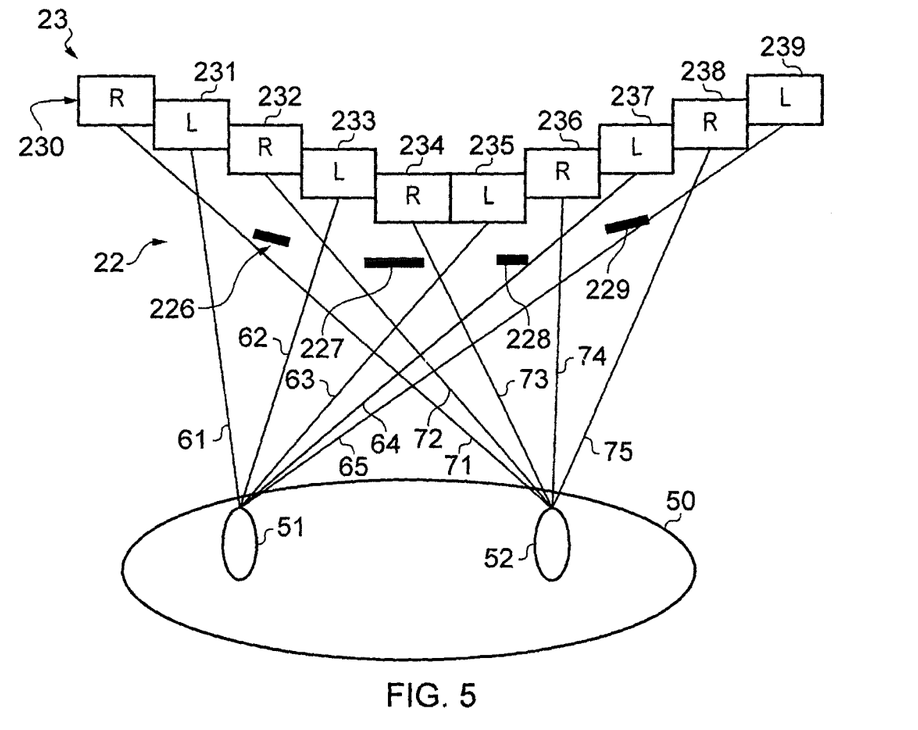
FIG. 5 schematically illustrates a viewer viewing a flexible auto-stereoscopic display that has been bent and the parallax barrier arrangement has been adjusted to compensate for the bending.

FIG. 5 illustrates an example of a situation in which the parallax barrier arrangement 22 of the flexible display 20 has been adjusted by the processor 12.

The processor 12 may adjust at least one or more properties of the parallax barrier arrangement 22 following bending of the flexible display 20. For example, the processor 12 may control the parallax barrier arrangement 22 to re-position the opaque regions and the slits in the parallax barrier arrangement 22, such that different regions of the parallax barrier arrangement 22 are opaque following bending, as compared with the parallax barrier arrangement 22 prior to bending. Alternatively or additionally, the width of one or more of the opaque regions may be adjusted.

In the FIG. 5 example, the parallax barrier arrangement 22 comprises opaque regions 226, 227, 228 and 229. The adjusted parallax barrier arrangement 22 enables the viewer's left eye 51 to see pixels 231, 233, 235, 237 and 239 displaying left eye image content (see light rays 61-65 in FIG. 5) and enables the viewer's right eye 52 to see pixels 230, 232, 234, 236 and 238 displaying right eye image content (see light rays 71-75 in FIG. 5).

The viewer's left eye 51 is prevented by the opaque regions 226-229 of the parallax barrier arrangement 22 from seeing the right eye image content being displayed by pixels 230, 232, 234, 236 and 238. The viewer's right eye 52 is prevented by the opaque regions 226-229 of the parallax barrier arrangement 22 from seeing the left eye image content being displayed by pixels 231, 233, 235, 237 and 239.

Adjustment of the parallax barrier arrangement 22 in accordance with bending of the flexible display 20 advantageously enables a (clear) stereoscopic image to continue to be conveyed to the viewer 50. In some embodiments, there is no need for the viewer 50 to change his viewing position in order to continue viewing the stereoscopic image displayed by the flexible display 20 after the display 20 has been bent. For example, in some implementations, the processor 12 may assume that the viewer's viewing position has not changed when the flexible display 20 is bent and it may adjust the parallax barrier arrangement 22 accordingly.

In other implementations, the processor 12 may use the image sensor(s) 13 to determine the positions of the viewer's eyes 51, 52. The processor 12 may use this information to determine how to enable a clear stereoscopic image to continue to be conveyed to the viewer 50 when the flexible display 20 is bent.

As mentioned above, in addition to adjusting the parallax barrier arrangement 22, the processor 12 may, for example, change the hue and/or the brightness of individual pixels that are partially obscured by the adjusted parallax barrier arrangement 22, in order to mitigate the change/degradation in the visual appearance of auto-stereoscopic image content being displayed by the flexible display 20 when the flexible display 20 is bent. For instance, in the context of the FIG. 5 example, the pixel 239 may be partially obscured to the viewer's left eye 51 by the opaque region 229. The processor 12 may determine this (for example, based upon the determined position of the viewer's left eye 51, the bending and any adjustments that have been made to the parallax barrier arrangement 22) and then increase the brightness of pixel 239 so that the pixel 239 appears (to the viewer's left eye 51) as it would have if it had not been partially obscured by the opaque region 229.

In some embodiments of the invention, the parallax barrier arrangement 22 may not be adjusted at all when the flexible auto-stereoscopic display 20 is bent. The processor 12 may merely change the hue and/or the brightness of pixels of the display panel 23 to compensate for the movement of the parallax barrier arrangement 22.

In some examples, the processor 12 may be configured to control the user output device 11 to cause an output to be provided to the viewer 50, following bending of the flexible display 20, which is associated with a switch from the display 20 displaying a stereoscopic image to the display 20 displaying a non-stereoscopic image. For example, if excessive bending of the display 20 has or is about to occur, the processor 12 may control the user output device 11 to provide a warning output to the viewer 50 (for example, by illuminating a warning light) after or prior to switching the flexible display 20 from displaying a stereoscopic image to displaying a non-stereoscopic image.

Figure 6:
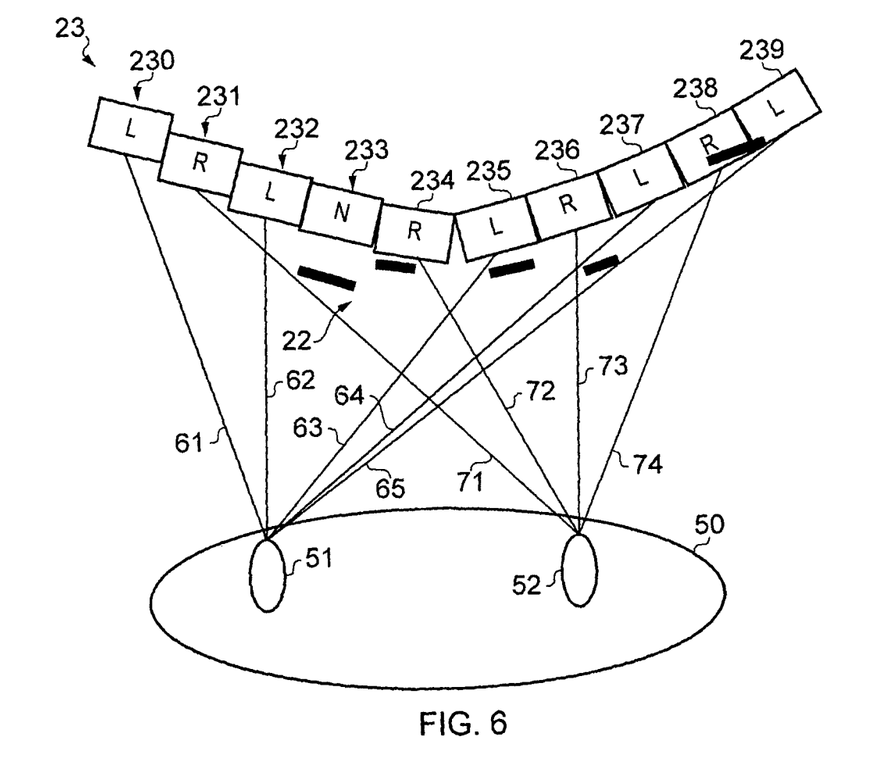
FIG. 6 schematically illustrates a change in how auto-stereoscopic content is displayed by the flexible auto-stereoscopic display in accordance with adjustment of the parallax barrier arrangement.

FIG. 6 illustrates an implementation in which the processor 12 responds to detecting bending of the flexible display 20 by changing how auto-stereoscopic content is displayed by the display panel 23, in accordance with adjustment of the parallax barrier arrangement 22. The processor 12 may, for example, change which pixels are viewable by one or both eyes 51, 52 of the viewer 50.

In this example, when the flexible display 20 is substantially planar, the processor 12 controls alternate columns of pixels of the display panel 23 to display left eye image content and right eye image content. Pixels 230, 232, 234, 236 and 238 display left eye image content and pixels 231, 233, 235, 237 and 239 display right eye image content.

When the parallax barrier arrangement 22 is adjusted in dependence upon the bending of the flexible display 20, the processor 12 controls the display panel 23 such that pixel 233 is not used to display any image content. Both eyes 51, 52 of the viewer 50 may be prevented from seeing pixel 233 by the adjusted parallax barrier arrangement 22. Pixels 230, 232, 235, 237 and 239 are controlled by the processor 12 to display left eye image content, and pixels 231, 234, 236 and 238 are controlled by the processor 12 to display right eye image content.

References to 'computer-readable storage medium', or a, 'computer', 'processor', etc. should be understood to encompass not only computers having different architectures such as single/multi-processor architectures and sequential (Von Neumann)/parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device, etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Figure 3:
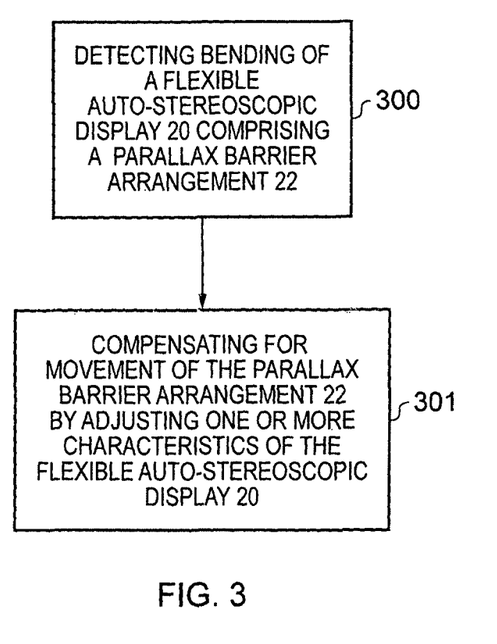
FIG. 3 illustrates a method.

The blocks illustrated in FIG. 3 may represent steps in a method and/or sections of code in the computer program instructions 16. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed. For example, the user output device 11 could be an aural device rather than a visual device, such as a loudspeaker.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:
1. An apparatus, comprising:
at least one processor; and
at least one memory storing computer program instructions configured, working with the at least one processor, to cause the at least one processor to perform at least the following:
causing, by the at least one processor, a parallax barrier arrangement of a flexible auto-stereoscopic display to display a plurality of opaque regions defining a plurality of slits;
causing, by the at least one processor, a first plurality of pixels of a display panel of the flexible auto-stereoscopic display to display first image content for a first eye of a viewer and a second plurality of pixels of the display panel of the auto-stereoscopic display to display second image content for a second eye of the viewer, wherein the parallax barrier arrangement is arranged to conceal the first plurality of pixels from the second eye of the viewer and arranged to conceal the second plurality of pixels from the first eye of the viewer;

detecting, by the at least one processor, bending of the flexible auto-stereoscopic display;

determining that the bending of the flexible auto-stereoscopic display has caused a first portion of the first image content to become visible to the second eye of the viewer; and responding to the determination that the first portion of the first image content has become visible to the second eye of the viewer, by adjusting one or more of the opaque regions of the parallax barrier arrangement, using the at least one processor, to change a size of at least one slit defined by adjacent opaque regions of the parallax barrier arrangement such that the first portion of the first image content is concealed from the second eye of the viewer.

2. The apparatus as claimed in claim 1, wherein the one or more opaque regions of the parallax barrier arrangement are adjusted by the at least one processor in dependence upon the position of the parallax barrier arrangement following bending of the flexible auto-stereoscopic display, and the positions of the first and second eyes of the viewer.

3. The apparatus as claimed in claim 2, wherein the positions of the first and second eyes of the viewer are determined using at least one image captured by one or more image sensors.

4. The apparatus as claimed in claim 1, wherein adjustment of the one or more opaque regions of the parallax barrier arrangement by the at least one processor depends upon where the flexible auto-stereoscopic display is bent.

5. The apparatus as claimed in claim 1, wherein adjustment of the one or more opaque regions of the parallax barrier arrangement by the at least one processor depends upon the extent to which the flexible auto-stereoscopic display is bent.

6. The apparatus as claimed in claim 1, wherein the computer program instructions are configured, working with the at least one processor, to cause the apparatus to: adjust the brightness of one or more pixels of the flexible auto-stereoscopic display, using the at least one processor, after detecting bending of the flexible auto-stereoscopic display.

7. The apparatus as claimed in claim 1, wherein the computer program instructions are configured, working with the at least one processor, to cause the apparatus to: adjust the hue of one or more pixels of the flexible auto-stereoscopic display, using the at least one processor, after detecting bending of the flexible auto-stereoscopic display.

8. The apparatus as claimed in claim 1, wherein the computer program instructions are configured, working with the at least one processor, to cause the apparatus to: change how the first portion of the first image content is displayed by the flexible auto-stereoscopic display.

9. The apparatus as claimed in claim 1, wherein the computer program instructions are configured, working with the at least one processor, to cause: the flexible auto-stereoscopic display to change from displaying a stereoscopic image to displaying a non-stereoscopic image, in response to further bending of the flexible auto-stereoscopic display.

10. The apparatus as claimed in claim 9, wherein the computer program instructions are configured, working with the at least one processor, to cause: an output to be provided to the viewer, following the bending of the flexible auto-stereoscopic display, which is associated with the switch from the flexible auto-stereoscopic display displaying a stereoscopic image to the flexible auto-stereoscopic display displaying a non-stereoscopic image.

11. The apparatus as claimed in claim 1, wherein the computer program instructions are configured, working with the at least one processor, to cause the at least one processor to further perform: determining that the bending of the flexible auto-stereoscopic display has caused a second portion of the first image content to become concealed from the first eye of the viewer; and responding to the determination that the second portion of the first image content has become concealed from the first eye of the viewer, by adjusting one or more opaque regions of the parallax barrier arrangement, using the at least one processor, to change a size of at least one slit defined by adjacent opaque regions of the parallax barrier arrangement such that the second portion of the first image content is visible to the first eye of the viewer.

12. A method, comprising:

causing, by at least one processor, a parallax barrier arrangement of a flexible auto-stereoscopic display to display a plurality of opaque regions;

causing, by the at least one processor, a first plurality of pixels of a display panel of the flexible auto-stereoscopic display to display first image content for a first eye of a viewer and a second plurality of pixels of the display panel of the auto-stereoscopic display to display second image content for a second eye of the viewer, wherein the parallax barrier arrangement is arranged to conceal the first plurality of pixels from the second eye of the viewer and arranged to conceal the second plurality of pixels from the first eye of the viewer;

detecting, by the at least one processor, bending of the flexible auto-stereoscopic display;

determining that the bending of flexible auto-stereoscopic display has caused a first portion of the first image content to become visible to the second eye of the viewer; and responding to the determination that the first portion of the first image content has become visible to the second eye of the viewer, by adjusting one or more of the opaque regions of the parallax barrier arrangement, using the at least one processor, to change a size of at least one slit defined by adjacent opaque regions of the parallax barrier arrangement such that the first portion of the first image content is concealed from the second eye of the viewer.

13. The method as claimed in claim 12, wherein the one or more opaque regions of the parallax barrier arrangement, are adjusted by the at least one processor in dependence upon the position of the parallax barrier arrangement following bending of the flexible auto-stereoscopic display, and the positions of the first and second eyes of the viewer.

14. A non-transitory computer readable medium storing computer program instructions that, when performed by at least one processor, cause at least the method of claim 12 to be performed.

15. The method as claimed in claim 12, further comprising:

determining that the bending of flexible auto-stereoscopic display has caused a second portion of the first image content to become concealed from the first eye of the viewer; and responding to the determination that the second portion of the first image content has become concealed from the first eye of the viewer, by adjusting one or more opaque regions of the parallax barrier arrangement, using the at least one processor, to change a size of at least one slit defined by adjacent opaque regions of the parallax barrier arrangement such that the second portion of the first image content is visible to the first eye of the viewer.

16. The method as claimed in claim 12, wherein the one or more opaque regions of the parallax barrier arrangement are adjusted by the at least one processor in dependence upon the position of the parallax barrier arrangement following bending of the flexible auto-stereoscopic display, and the positions of the first and second eyes of the viewer.

17. The method as claimed in claim 16, wherein the positions of the first and second eyes of the viewer are determined using at least one image captured by one or more image sensors.

18. The method as claimed in claim 12, wherein adjustment of the one or more opaque regions of the parallax barrier arrangement by the at least one processor depends upon where the flexible auto-stereoscopic display is bent.

19. The method as claimed in claim 12, wherein adjustment of the one or more opaque regions of the parallax barrier arrangement by the at least one processor depends upon the extent to which the flexible auto-stereoscopic display is bent.

20. An apparatus, comprising:
at least one processor; and
at least one memory storing computer program instructions configured, working with the at least one processor, to cause the at least one processor to perform at least the following:
causing, by the at least one processor, a parallax barrier arrangement of a flexible auto-stereoscopic display to display a plurality of opaque regions;
causing, by the at least one processor, a first plurality of pixels of a display panel of the flexible auto-stereoscopic display to display first image content for a first eye of a viewer and a second plurality of pixels of the display panel of the auto-stereoscopic display to display second image content for a second eye of the viewer, wherein the parallax barrier arrangement is arranged to conceal the first plurality of pixels from the second eye of the viewer and arranged to conceal the second plurality of pixels from the first eye of the viewer;
detecting, by the at least one processor, bending of the flexible auto-stereoscopic display;
determining that the bending of the flexible auto-stereoscopic display has caused a first portion of the first image content to become concealed from the first eye of the viewer; and
responding to the determination that the first portion of the first image content has become concealed from the first eye of the viewer, by adjusting one or more opaque regions of the parallax barrier arrangement, the at least one processor, to change a size of at least one slit defined by adjacent opaque regions of the parallax barrier arrangement such that the first portion of the first image content is visible to the first eye of the viewer.

* * * * *

UNITED STATES PATENT AND TRADEMARK OFFICE
CERTIFICATE OF CORRECTION

PATENT NO. : 9,965,064 B2
APPLICATION NO. : 14/351737
DATED : May 8, 2018
INVENTOR(S) : Rissa et al.

Page 1 of 1

It is certified that error appears in the above-identified patent and that said Letters Patent is hereby corrected as shown below:

On the Title Page

Column 1,
Item (71), in "Applicant", Line 1, "Nokia Corporation" should read --Nokia Technologies Oy--.

In the Claims

Column 10,
Line 49, Claim 13 "arrangement," should read --arrangement--.

Column 12,
Line 24, Claim 20 "the at" should read --using the at--.

Signed and Sealed this
Fourth Day of June, 2019

Andrei Iancu
*Director of the United States Patent and Trademark Office*